US 6,721,509 B2

(12) United States Patent
Xiao et al.

(10) Patent No.: US 6,721,509 B2
(45) Date of Patent: Apr. 13, 2004

(54) SELF-ADJUSTING OPTICAL ADD-DROP MULTIPLEXER AND OPTICAL NETWORKS USING SAME

(75) Inventors: Guohua Xiao, Plano, TX (US); Xiaoping Mao, Plano, TX (US); Lintao Zhang, Richardson, TX (US); Xiaofan Cao, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 595 days.

(21) Appl. No.: 09/730,698

(22) Filed: Dec. 5, 2000

(65) Prior Publication Data

US 2002/0101636 A1 Aug. 1, 2002

(51) Int. Cl.[7] .............................................. H04J 14/02
(52) U.S. Cl. ........................ 398/83; 398/82; 385/140
(58) Field of Search ...................... 398/82–85; 385/140, 385/24

(56) References Cited

U.S. PATENT DOCUMENTS

| | | | | |
|---|---|---|---|---|
| 5,612,805 A | * | 3/1997 | Fevrier et al. ................. | 398/83 |
| 5,959,749 A | * | 9/1999 | Danagher et al. .............. | 398/83 |
| 6,519,059 B1 | * | 2/2003 | Doerr et al. .................... | 398/83 |

OTHER PUBLICATIONS

Avanex Corporation, brochure entitled "Technology" (2000).
Avanex Corporation, brochure entitled "PowerShaper: Dispersion Management Processors" (2000).
Avanex Corporation, brochure entitled "PowerFilter: Wavelength Separators" (2000).
Avanex Corporation, brochure entitled "PowerExchanger: Optical Add/Drop Processors" (2000).
Avanex Corporation, brochure entitled "PowerMux: Channel Processors" (2000).
Avanex Corporation, preliminary data sheet for PowerMux NxG Channel Processor, Periodic Wavelength Processor, PMP NxG Series (2000).
Avanex Corporation, data sheet for PowerMux Channel Processor, 80 Channel Wavelenght Channel Processor, PMC Series (2000).
Avanex Corporation, data sheet for PowerMux Channel Processor, 40 Channel Wavlength Channel Processor, PMC Series (2000).
Avanex Corporation, data sheet for PowerMux Channel Processor, 16 Channel Wavelength Channel Processor, PMC Series (2000).
Avanex Corporation, data sheet for PowerFilter Wavelength Separator, 8 Channel Wavelength Channel Separator, PFC Series (2000).
Avanex Corporation, preliminary data sheet for PowerMux Channel Processor, Periodic Wavelength Processor, PMP Series (2000).

(List continued on next page.)

*Primary Examiner*—Kinfe-Michael Negash
(74) *Attorney, Agent, or Firm*—Burns, Doane, Swecker & Mathis LLP

(57) ABSTRACT

A self-adjusting optical add-drop multiplexer monitors the power in a drop signal and attenuates the power in an add signal to match the power in express WDM channels (signals). When used in a fiber network, and more particularly, in a metro network, the deleterious effects of optical amplification are reduced. Power attenuation is also used in an optical switching assembly particularly useful in two-fiber ring network. The optical switching assembly monitors drop channels from the two rings of the network and attenuates the add channel(s) accordingly. An optical switch operates to direct the drop signal from one of the two rings to a receiver in accordance with a control signal based on the monitored drop channels. The self-adjusting optical add-drop multiplexer also monitors the power in the drop signals and issues an alarm if the drop signal is of a power level above or below predetermined levels.

4 Claims, 6 Drawing Sheets

OTHER PUBLICATIONS

Avanex Corporation, data sheet for PowerFilter Wavelength Separator, Wavelength Band Separator, PFB Series (2000).

Avanex Corporation, data sheet for PowerFilter Wavelength Separator, Wavelength Band Separator, PFB Series (2000).

Avanex Corporation, preliminary data sheet for Power-Shaper Dispersion Management Processor, Fixed Dispersion Compensation Processor, PSD Series (2000).

Avanex Corporation, data sheet for PowerFilter Wavelength Separator, 16 Channel Wavelength Channel Separator, PFC Series (2000).

Avanex Corporation, preliminary data sheet for Power-Shaper Dispersion Management Processor, Provisional Dispersion Compensation Processor, PSD Series (2000).

Avanex Corporation, preliminary data sheet for SuperPowerShaper Variable Dispersion and Slope Compensation Processor (2000).

Avanex Corporation, preliminary data sheet for PowerExpress Optical Line Amplifier Processor (2000).

Avanex Corporation, preliminary data sheet for PowerExchanger Reconfigurable Optical Add/Drop Processor (2000).

* cited by examiner

SELF-ADJUSTING OPTICAL ADD-DROP MULTIPLEXER AND OPTICAL NETWORKS USING SAME

FIELD OF THE INVENTION

The present invention relates to optical communications network systems that carry wavelength division multiplexed (WDM) signals. More particularly, the present invention relates to WDM optical communications network systems that utilize optical add-drop multiplexers, wherein each such multiplexers add and/or remove one or more optical signals from the network.

BACKGROUND OF THE INVENTION

Optical add-drop multiplexer (OADM) technology substantially reduces the cost of Dense Wavelength Division Multiplexing (DWDM) optical networks. An example of a conventional OADM configuration within a DWDM system is shown in FIG. 1. In the conventional system 100 shown in FIG. 1, a multi-channel optical signal 102 is delivered to the input port 103 of OADM device 120. The optical signal comprises a plurality of channels, each comprising a different unique wavelength range, where each channel is denoted by its respective center wavelength, $\lambda_1$, $\lambda_2$, $\lambda_3$, etc. A first optical filter 106a is used to remove or "drop" one of the incoming multiple channels, e.g., $\lambda_1$, and to pass through the remaining "express" channels $\lambda_2$, $\lambda_3$, and $\lambda_4$ as signals 104. A second optical filter 106b is used to add a channel $\lambda_1'$ into the optical path containing the express channels. The express channels exit from OADM 120 apparatus together with the added channel $\lambda_1'$ as a single combined signal 112 at the output port 105.

An example of an optical communications network system containing a conventional OADM is demonstrated in FIG. 2. In the conventional network system 200, a plurality of channels $\lambda_1$, $\lambda_2$, . . . , $\lambda_N$ are transmitted between end locations 202a and 202b. The optical network comprises end locations 202a and 202b, a plurality of n intermediate locations, or "nodes" 206.1–206.n disposed between the end locations, and a sequence of optical fiber spans 208.1–208.(n+1) optically connecting the nodes 206.1–206.n and the end locations 202a–202b to one another in a single chain. The first end location 202a comprises a WDM multiplexer (MUX) 204a that combines the channels from separate input paths into a single combined signal that is delivered to a first span 208.1 of optical fiber. Likewise, the second end location 202b comprises a WDM de-multiplexer (DEMUX) 204b that receives a set of combined channels from the last span 208.(n+1) of optical fiber and separates these channels into separate output paths.

Optical signals $\lambda_i$, $\lambda_j$, $\lambda_i'$, and $\lambda_j'$ are added and/or dropped from the chain of optical fiber spans 208.1–208.(n+1) at each of the nodes 206.1–206.n. Each node is disposed between two such consecutive spans of optical fiber and the optical fiber spans join the nodes to one another. Each of the nodes 206.1–206.n comprises a respective one of a set of n OADMs 210.1–210.n that performs the adding and dropping of channels at the node. The OADMs are required in order to allow each of the nodes access to a respective portion of the network traffic while, at the same time maintain the integrity of other channels. Without such OADMs, all channels would have to be terminated at each intermediate node even for a small portion of traffic exchange.

One characteristic of the conventional OADM structure shown in FIG. 1 is that the added channel $\lambda_1'$ generally comprises an optical power that is different from the powers of the express channels. This power difference arises because the added channel originates from a different optical path from those of the express channels and thus generally incurs a unique set of insertion loss along this path. This unequal-power characteristic does not impose any negative impact to the early local (e.g., "metropolitan" or "metro") multi-channel OADM systems wherein no optical amplifiers are used. However, the trend of late is to widely deploy amplifiers in such metro OADM systems in order to stretch the link distance and reach more customers. If channels in such an optical network have differing power levels, the weak signals could quickly dissipate after passing through a chain of amplifiers, due to the gain competition of the amplifiers. Therefore, the use of conventional OADM apparatus within a metro optical network also comprising optical amplifiers presents some problems.

SUMMARY OF THE INVENTION

In order to overcome the aforementioned problems with conventional OADMs, and particularly, systems such as metro systems making use of such OADMs, the present invention discloses a novel optical network system that utilizes a new inventive design of self-adjusting OADM. The self-adjusting OADM in accordance with the invention automatically adjusts the power of an added channel with reference to the power of a dropped channel, so that the output channels of the OADM all have a comparable power level. The self-adjusting OADM of the present invention comprises a first optical filter or similar wavelength-selective component that removes a channel from a WDM (a wavelength division multiplexed) signal and passes through the other channels, a drop line that receives the removed channel, a beam combiner, such as a second optical filter, that adds a new channel to the other channels, an add line that delivers the added channel to the network, a first optical tap on the drop line, a second optical tap on the add line, a variable optical attenuator (VOA) on the add line, and a controller. The first and second optical taps divert known sample portions of the dropped and added channels, respectively, to the controller. The controller receives the sample portions, and, based upon these samples, controls the variable optical attenuator so that the added channel enters into the network at a suitable power level, preferably one that is substantially equal to those of the other channels.

The invention further comprises an optical ring network having a plurality of optical exchange nodes and a plurality of optical amplifiers disposed in a ring configuration, wherein each node includes a self-adjusting OADM. In accordance with one embodiment, the optical ring network is a two-fiber ring network having a pair of rings, one for signals propagating in what is referred to as a clockwise direction, and one for signals propagating in a counterclockwise direction. Each node includes a switching assembly which comprises a pair of OADMs each in optical communication with an associated one of the rings. The switching assembly is also provided with an optical switch which operates in one of two states in accordance with a first control signal from a controller also provided in the switching assembly. In one state, the optical switch propagates signals from one of the OADMs and associated ring to an optical receiver at a subscriber location, while in the other state the optical switch propagates signals from the other one of the OADMs and associated ring to the optical receiver. The first control signal is provided to the switch by a controller which outputs the control signal in accordance with the relative power of drop signals from the two OADMs. In accordance with a further aspect of the invention, the controller also issues second and third control signals, which are used to control the attenuation of an add signal provided by an optical transmitter to the OADMs for combination with the WDM signals in the two rings of the two-fiber ring network. The second and third control signals control the attenuation of first and second variable optical attenuators operating on the add signal. The self-adjusting OADM of the present invention enables the deployment of optical amplifiers within metropolitan optical network so that the link distance is significantly increased.

The present invention includes a method for controlling the power of an add channel of an optical add-drop multiplexer (OADM) used to add the add channel to a wavelength division multiplexed (WDM) signal and to drop a drop channel from the WDM signal, the method comprising comparing the power of the add channel with the power of the drop channel and attenuating the power of the add channel to match the power of the express WDM channels.

The present invention also includes a method for selectively directing, to a receiver, the optical signal of a predetermined channel of a wavelength division multiplexed (WDM) signal of a two-fiber ring, the two-fiber ring having a first ring and a second ring each adapted to propagate said predetermined channel, the method comprising comparing at least a portion of the power of the optical signal of the predetermined channel of the first ring with at least a portion of the power of the optical signal of the predetermined channel of the second ring, and directing the signal of the predetermined channel having the greater power to the to the receiver.

The present invention also includes a method for conducting a wavelength division multiplexed (WDM) signal between an interconnection line and one or more subscribers using a fiber ring network, the WDM signal comprising a plurality optical signals each associated with a channel, the method comprising comparing the power of a predetermined channel of the WDM signal from the fiber network with the power of an add channel from a subscriber, attenuating the power the of the add channel as necessary to match the power of the predetermined channel, and combining the add channel with the WDM signal.

DETAILED DESCRIPTION OF THE INVENTION

The following description is presented to enable one of ordinary skill in the art to make and use the invention. Various modifications to what is set forth by way of example only will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the method and system of the present invention, the reader is referred to the appended FIGS. 3–6 in conjunction with the following description.

Figure 1:
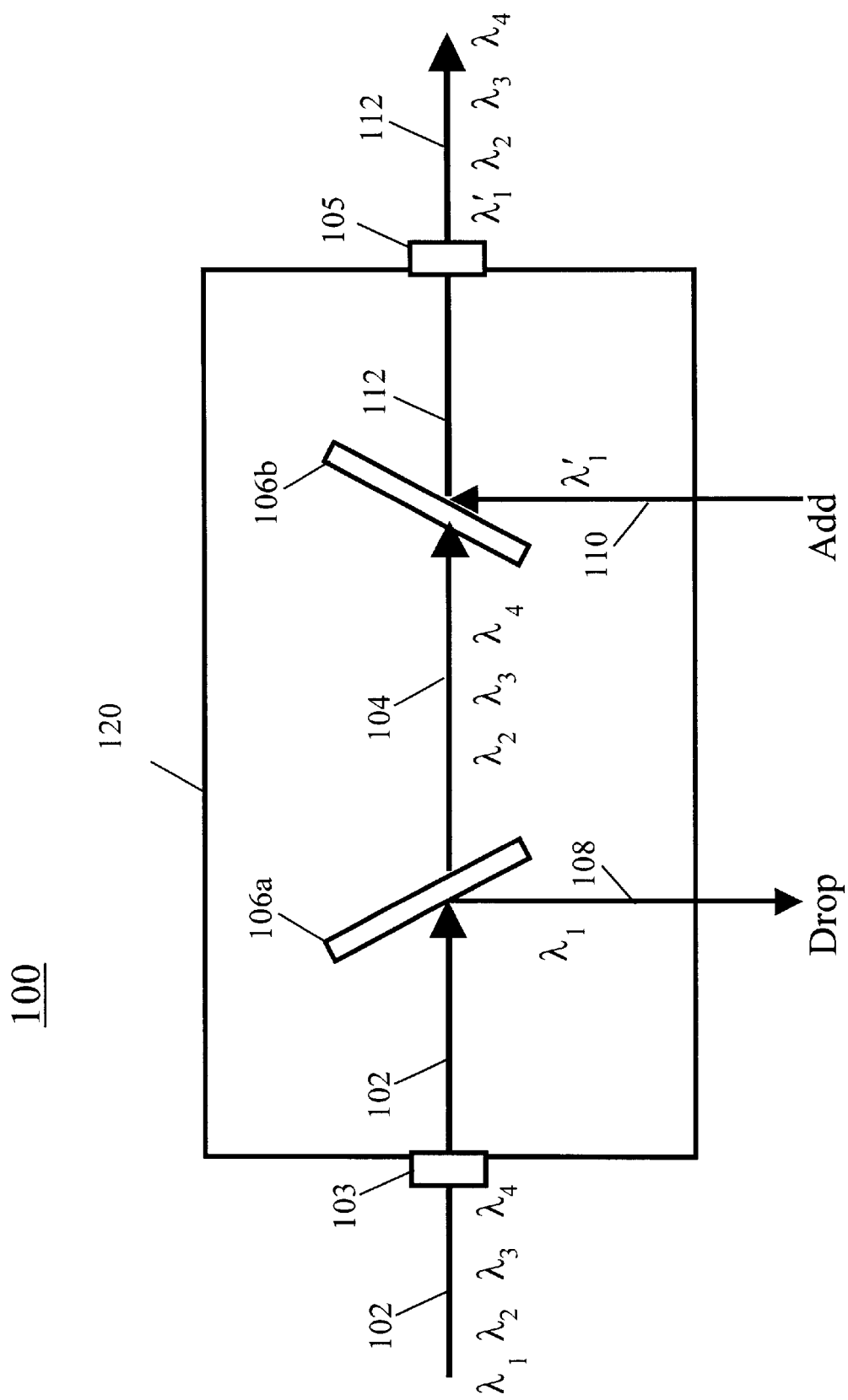
FIG. 1 illustrates a conventional one channel OADM.
Figure 2:
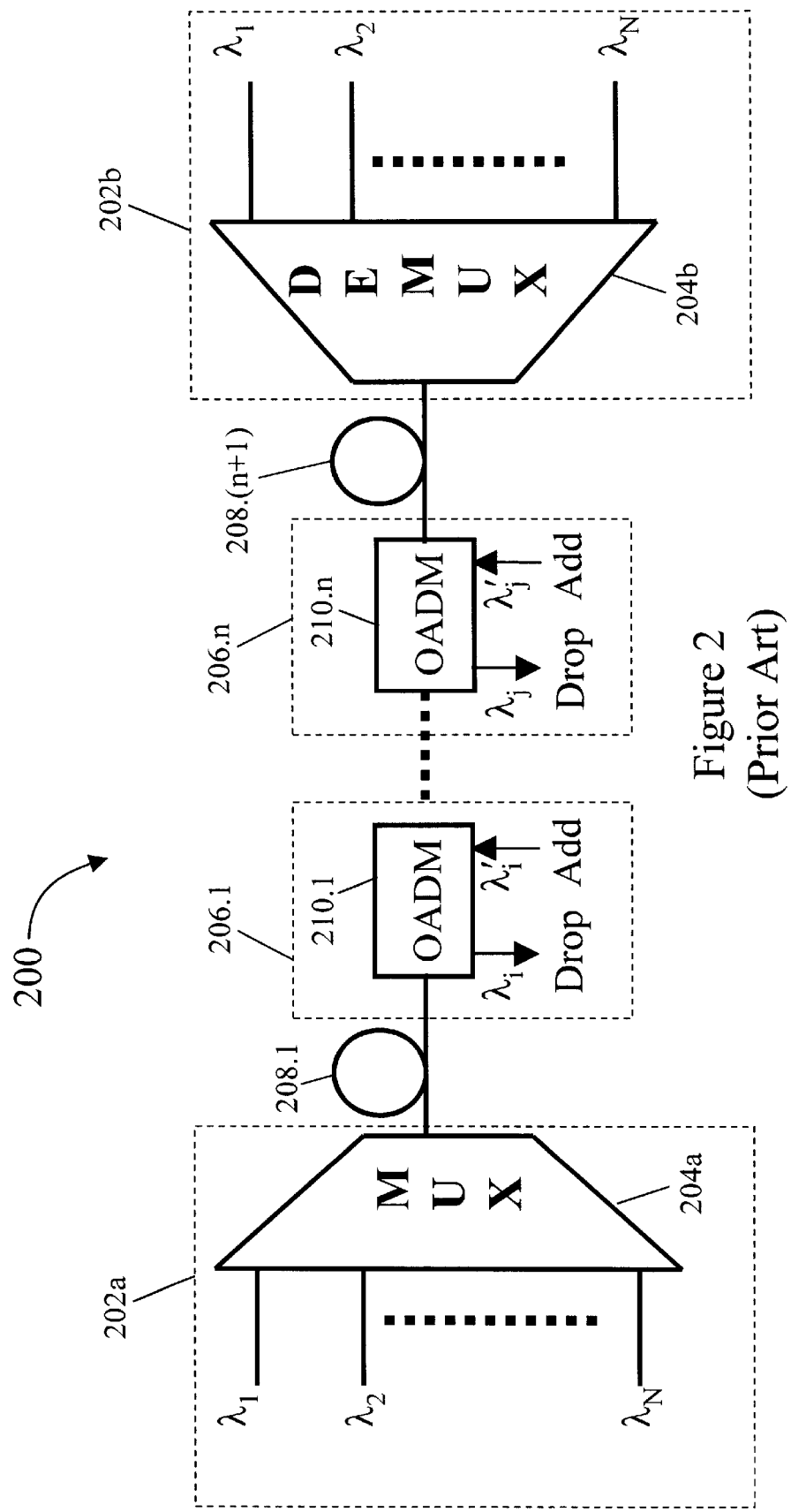
FIG. 2 illustrates a conventional point-to-point network comprising end locations and intermediate nodes with OADMs.
Figure 3:
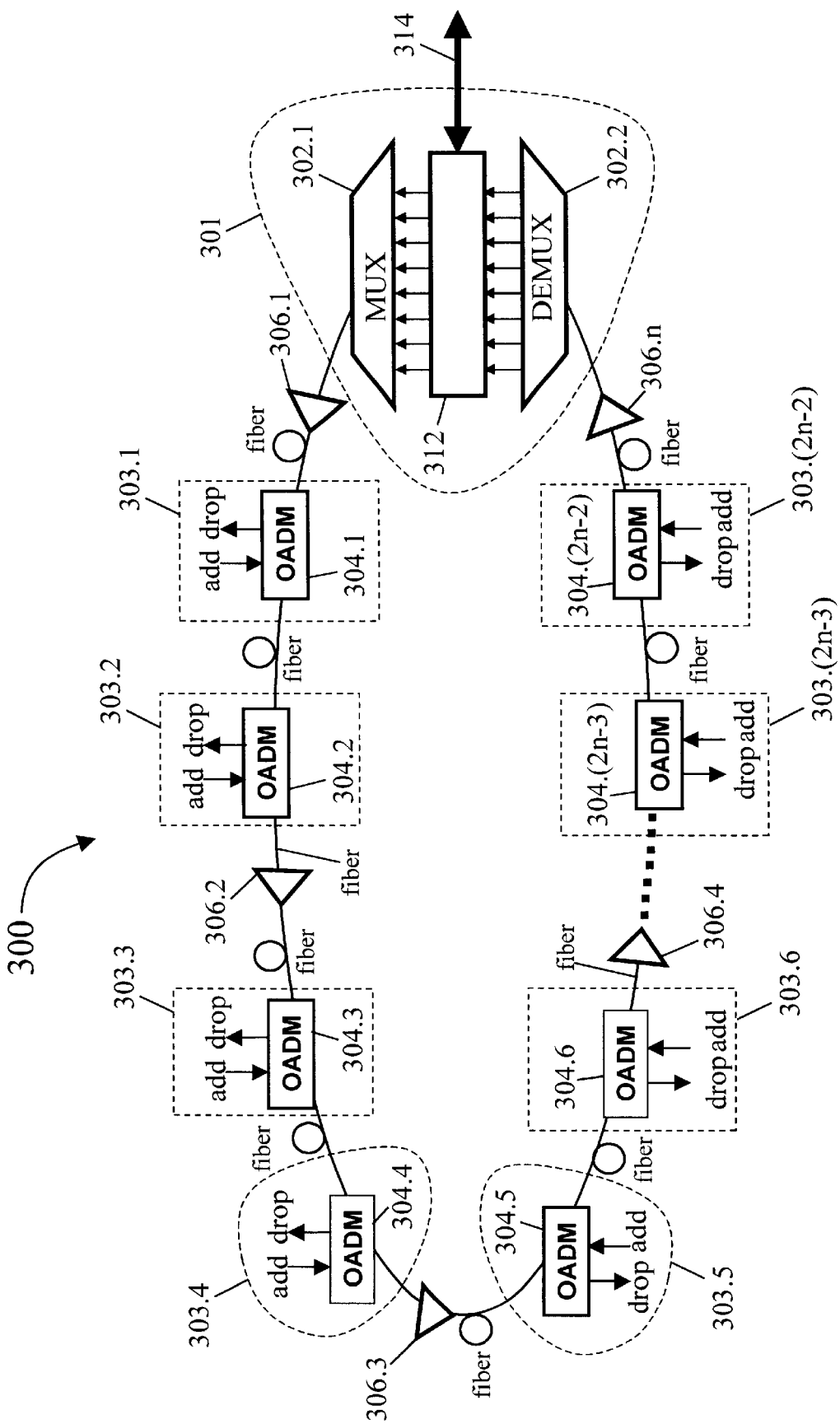
FIG. 3 illustrates an amplified multi-channel OADM optical network in accordance with the present invention.

FIG. 3 illustrates an amplified multi-channel OADM optical network system in accordance with the invention. In the optical network system 300 shown in FIG. 3, a plurality of n optical amplifiers 306.1–306.n and a plurality of 2n–2 exchange nodes 303.1–303.(2n–2) are disposed in a ring configuration around a central node 301. Each one of the exchange nodes 303.1–303.(2n–2) includes a single respective one of the self-adjusting OADMs (optical add-drop multiplexers) 304.1–304.(2n–2). The central node 301 includes a DWDM multiplexer (MUX) 302.1, a DWDM de-multiplexer (DEMUX) 302.2 and a router switch 312 that is optically coupled to both the MUX 302.1 and the DEMUX 302.2. The central node 301, the exchange nodes 303.1–303.(2n–2) and the optical amplifiers 306.1–306.n are all interconnected in a ring configuration by spans of optical fiber.

In operation of the ring network system 300 (FIG. 3), information signals, which may be in either electrical or optical form, are transferred to and from the ring network 300 and external networks by an interconnection line 314, which, in the optical case, is preferably an optical fiber or fiber bundle. The router switch 312 transforms incoming signals from the interconnection line 314 into optical channels which are designated by a corresponding central wavelength. It will be appreciated, however, that the central wavelength designation is for purposes of convenience, and that the signal corresponding to each channel in fact spans a range of wavelengths around the central wavelength. From router switch 312 the optical signals are delivered to the MUX 302.1. The MUX 302.1 receives optical channels along separate paths from the router switch 312 and combines these channels into a single WDM optical signal that is delivered to the ring. This optical signal is delivered to each one of the exchange nodes 303.n within the sequence of nodes comprising the ring by the various spans of optical fiber. A self-adjusting OADM 304.n at each of the exchange nodes drops one or more optical channels from the WDM optical signal and/or adds one or more optical channels to the remaining channels, wherein the power of the added channel is controlled such that it is compatible with the power of the WDM signal in the network. It will be noted that the dropped or added signals at a node may have the same channel designation. That is, an optical signal of a particular wavelength band may be dropped from the WDM signal at a node, and an optical signal of the same wavelength band may then be added, at the same node, to the WDM signal. Finally, the WDM signal arrives at the DEMUX 302.2, wherein the channels comprising the WDM optical signal are separated so that each channel is output along a separate respective path. The separated channels are then delivered to the router switch 312 and then to the interconnection line 314. Upon traversing the ring from the MUX 305, through the nodes 303.1–303.(2n–2) to the DEMUX 302.2, the WDM signal encounters each one of the optical amplifiers 306.1–306.n, at which the optical power may be amplified. Since different signals enter the ring at different locations and experience different optical losses in traversing different paths, the optical powers of the signals may vary, and the optical amplifiers 306.n impact the signals differently due to the effects of gain competition among the signals. This results in problems of compromised performance, which are addressed by using self-adjusting optical add-drop multiplexers in the nodes 303.1–303.(2n−2) as explained below.

Figure 4:
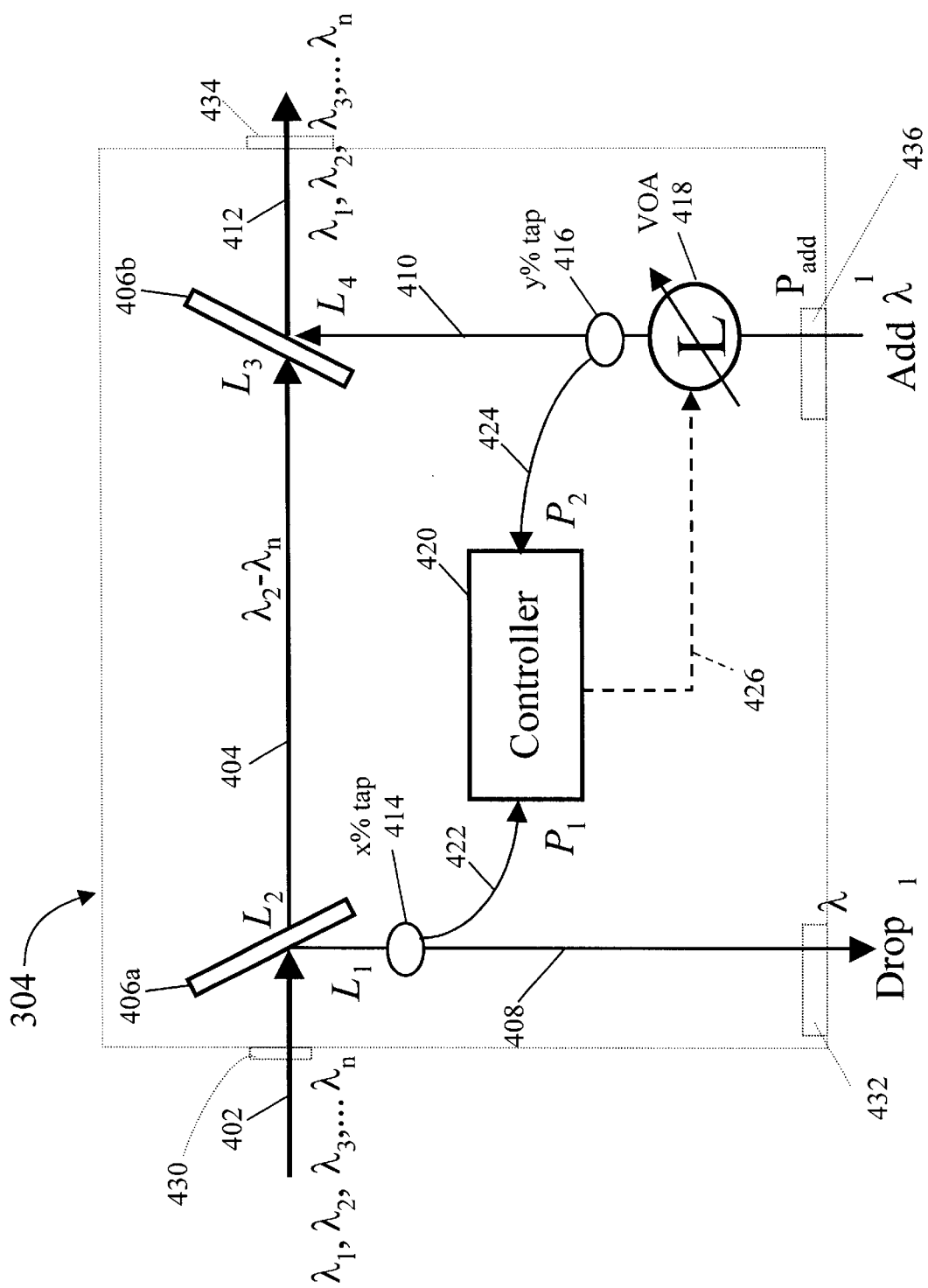
FIG. 4 provides a schematic illustration of a self-adjusting OADM as utilized within the first preferred embodiment of an amplified multi-channel OADM optical network in accordance with the present invention.

FIG. 4 provides a schematic illustration of a self-adjusting optical add-drop multiplexer (OADM) in accordance with the present invention. The general principle of operation of the self-adjusting OADM 304 illustrated schematically in FIG. 4 is utilized within each one of the nodes 304.1–304.(2n−2) of the amplified ring network 300 (FIG. 3). The self-adjusting OADM 304 (FIG. 4) comprises an optical input port 430 for receiving optical WDM (wavelength division multiplexed) input signals propagating in an input path, for example along input line 402. Input line 402 can be an optical fiber or other suitable light guide, or a combination such components. As explained above, the individual optical input signals comprise channels, which for convenience are referenced by central wavelength designations $\lambda_1, \lambda_2, \ldots, \lambda_n$. However, it is to be understood that the optical signal of each channel falls within a range of wavelengths around the central wavelength designation. At least one wavelength-selective component, operating as a beam separator, which can for example be an optical filter 406a, is optically coupled to the input line 402. Filter 406a is preferably a bandpass filter which can select one or more of the input signals, although it is contemplated that one or more cutoff (highpass or lowpass) filters, or combinations of such devices, can be used for this purpose. The selected input signal, or channel, is referred to as a drop signal or drop channel and is directed along a drop path, such as a drop line 408, which again can be an optical fiber, guiding component, or combination of such devices. Drop line is 408 is optically coupled to filter 406a and conducts the drop signal to drop port 432 as an output of self-adjusting OADM 304. In operation, self-adjusting OADM 304 thus functions to selectively extract the optical signals of one or more channels received at input port 430 and to direct the extracted, or "dropped" optical signals out of drop port 432 to a receiver (not shown) at a subscriber location in optical communication with self-adjusting OADM 304.

Signals that are not selected by filter 406a are passed through, as "express channels," along an optical path 404, which can be an optical fiber or other suitable light guiding component. At least one beam combiner, such as a second filter 406b, intercepts the express channels, which then pass therethrough as output signals along output line 412 and exit the device via output port 434.

Self-adjusting OADM 304 is provided with at least one add port 436 which in operation receives one or more optical add signals, or channels, from transmitters (not shown) at corresponding remote subscriber locations(s). An add signal is propagated along an add line 410 which again can be a fiber or other suitable guiding component. The add signal is directed to filter 406b, which combines the add signal with the express signals of optical path 404 for outputting from device 304 via output port 434.

Drop line 408 and add line 410 are in optical communication with a controller 420 via monitoring lines 422 and 424, respectively. Lines 422 and 424 deliver predetermined portions of the power of the drop and add signals on lines 408 and 410, using optical taps 414 and 416. The controller, based on the power level in the predetermined portions, issues a control signal which is delivered via control line 426 to a variable optical attenuator (VOA) 418 which serves to attenuate the add signal on add line 410 before it is combined with the express signals by filter 406b and output from self-adjusting OADM 304 through output port 434. The attenuation is effected in accordance with the control signal from the controller 420, which effectively operates to match the powers of the add and drop signals explained below.

In operation of the self-adjusting OADM 304, a WDM signal comprising the set of wavelengths (channels) $\lambda_1$–$\lambda_n$ is delivered to the OADM 304 through input port 402. The first optical filter 406a removes ("drops") a channel (for instance $\lambda_1$) from the input WDM signal and passes the other "express" channels $\lambda_2$–$\lambda_n$ through to the express line 404. The dropped channel $\lambda_1$ first experiences $L_1$ insertion loss (in units of dB) from the drop filter. Then, a predetermined x % of the remaining power of the dropped channel $\lambda_1$ is tapped by x % tap 414. The tapped signal is a first monitoring signal that is delivered to the controller 420 via the first tap line 422. The optical power, $P_1$, of the first monitoring signal is equal to $$P_1 = In - L_1 + 10\log(x\%) \tag{1}$$

where In is the power (in dBm) of every input channel before it enters into self-adjusting OADM 304.

The express channels $\lambda_2$–$\lambda n$, which are not dropped by the drop filter 406a, encounter the second "add filter" 406b after experiencing some small insertion loss $L_2$ dB from the first "drop" filter 406a. The function of the add filter 406a is to combine another channel $\lambda'_1$, usually at the same wavelength as $\lambda_1$, to the express channels. The channel $\lambda'_1$ is delivered to the filter 406b through the add line 410. At the output 412 of the OADM 304, there may be the same number of channels as at the input 402. However, the added wavelength $\lambda'_1$ contains new signal information from the local node at which the self-adjusting OADM 304 is located. The power of each of the express channels $\lambda_2$–$\lambda_n$ at the output is given by:

$$P_{express} = In - L_2 - L_3 \tag{2}$$

where $L_3$ is the insertion loss (in dB) introduced by the add filter to the express channels.

The variable optical attenuator (VOA) 418 introduces L dB insertion loss to the added channel $\lambda'_1$. Another y % of its power is taken by the y % tap 416 to provide a second monitoring signal, of power $P_2$, to the controller 420 via the second tap line 424. Finally the added channel experiences an $L_4$ dB insertion loss when it is combined with the express channels. The power $P_{add,out}$ out of the added channel $\lambda'_1$ after combination with the express channels $\lambda_2$–$\lambda_n$ is equal to:

$$P_{add,out} = P_{add} - L + 10\log(y\%) - L_4 \tag{3}$$

where $P_{add,out}$ is the power of the added channel $\lambda'_1$ prior to passing through the VOA 418.

When entering into the controller 420 the second tapped signal has power level $P_2$ that is given by:

$$P_2 = P_{add} - L + 10\log(y\%) \tag{4}$$

The function of the controller 420 is to provide a control signal 426 to the VOA 418 so that the VOA 418 provides an appropriate attenuation L so that $$P_{add,out} = P_{express} \tag{5}$$

Then from Eqs. 2, 3, 4, and 5, it follows that $$P_2 = \text{In} - L_2 - L_3 + 10 \log\left(\frac{y\ \%}{1 - y\ \%}\right) + L_4 \quad (6)$$

The power level $P_1$, which is acquired by the controller 420 provides the input power level In. Introducing Eq. 1 to Eq. 6 results in:

$$P_2 = P_1 + L_1 - 10 \log(x\ \%) - L_2 - L_3 + 10 \log\left(\frac{y\ \%}{1 - y\ \%}\right) + L_4 \quad (7)$$

In Eq. 7, $L_1$–$L_4$ are known from the filter properties and $P_1$ is collected by the controller 420 through the first tap line 422. If the control signal 426 adjusts the VOA in such way that $P_2$ satisfies Eq. 7, then all channels output from the OADM 304 will have the same power level. In the present invention, OADM 304 is self-adjusting so that there is no need of any external control.

Figure 5:
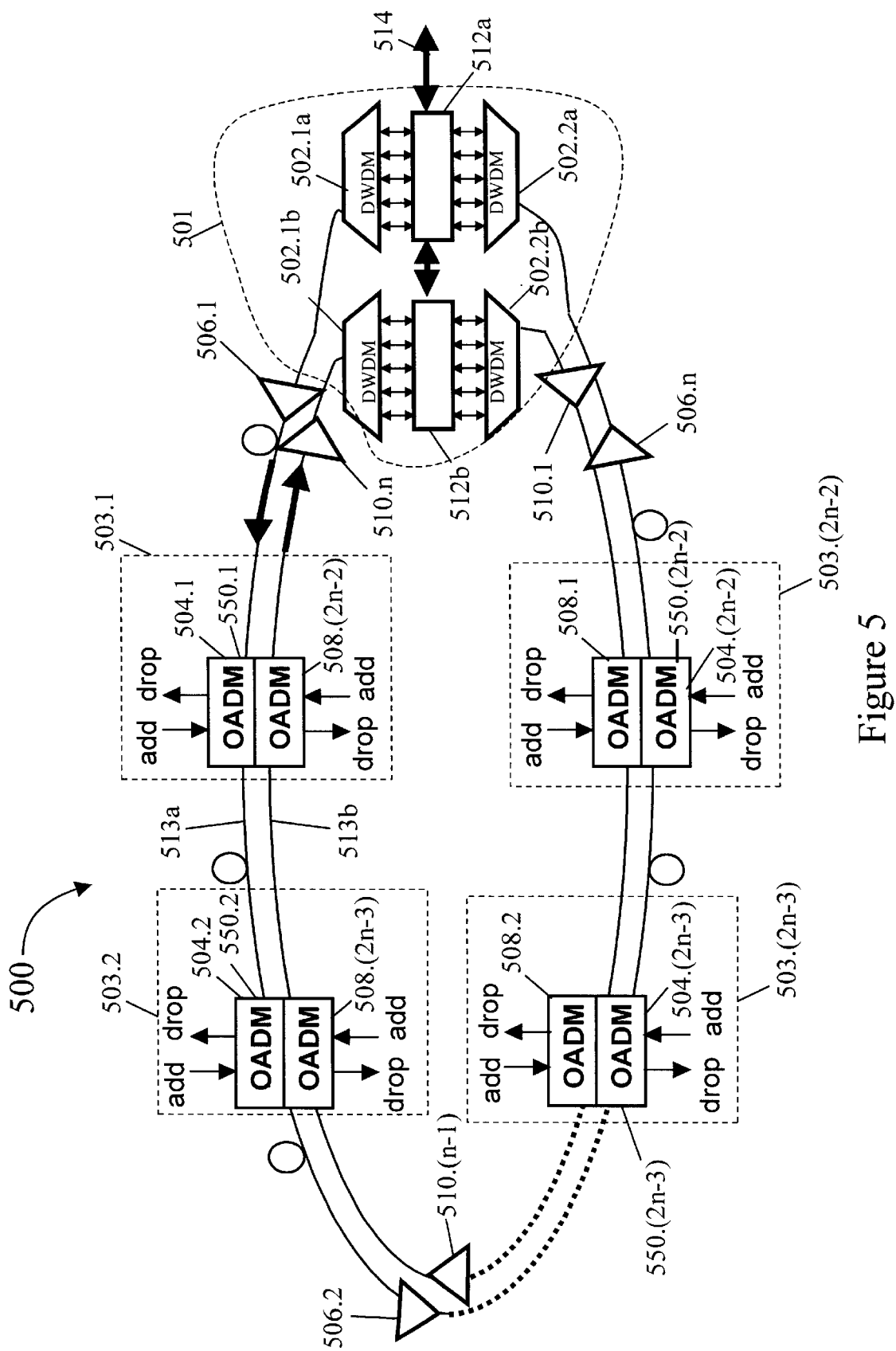
FIG. 5 illustrates an amplified multi-channel OADM optical network in accordance with the present invention that comprises a two-fiber ring network.

FIG. 5 illustrates an amplified two-fiber ring multichannel OADM optical network 500 in accordance with the invention. The two-fiber ring network 500 comprises a first counterclockwise logical ring 513a and a second clockwise logical ring 513b. Network traffic in the rings normally counter-propagates—that is, in one ring it runs in one direction, and the in the other ring it runs in the other direction. During normal operation, the two rings carry traffic concurrently. However, in the event of damage or loss of fiber integrity, a switching operation is contemplated such that signal traffic in a compromised ring is diverted to the other, uncompromised ring.

In the amplified two-fiber ring optical network 500 shown in FIG. 5, a first plurality of n optical amplifiers 506.1–506.n are disposed within the counterclockwise ring 513a and a second plurality of n optical amplifiers 510.1–510.n are disposed within the clockwise ring 513b. A plurality of 2n–2 exchange nodes 503.1–503.(2n–2) are disposed within both rings around a central node 501 that is likewise disposed within both rings. Each one of the exchange nodes 503.1–503.(2n–2) includes a switching assembly 550.(2n–2) having a pair of OADMs 504.n and 508.n, respectively associated with the two counter-propagating rings of the two-fiber ring network.

A central node 501 of network system 500 comprises a first pair of DWDMs 502.1a, 502.1b, a second pair of DWDMs 502.2a, 502.2b, a pair of router switches 512a, 512b that are optically coupled to both pairs of DWDMs, and an interconnection line 514 coupled to the router switches 512a, 512b. Each of the DWDMs can operate as either a multiplexer or a de-multiplexer depending upon the direction (clockwise or counterclockwise) of network traffic within the system 500. The router switches 512a, 512b transform incoming signals from the interconnection line 514 into respective optical channels at respective different wavelengths and deliver these channels to either the associated DWDMs, depending upon whether network traffic propagates counterclockwise along ring 513a or clockwise along ring 513b, respectively. It will be appreciated that the rings carry overlapping channels—for example the $\lambda_1$ channel at any one time can be propagated in the clockwise ring, the counterclockwise ring, or both rings at the same time. The router switches 512a, 512b receive optical channels from the associated DWDMs, depending upon whether network traffic propagates clockwise along ring 513b or counterclockwise along ring 513a, respectively, and transform these channels into respective signals that are output from the network 500 by the interconnection line 514.

Figure 6:
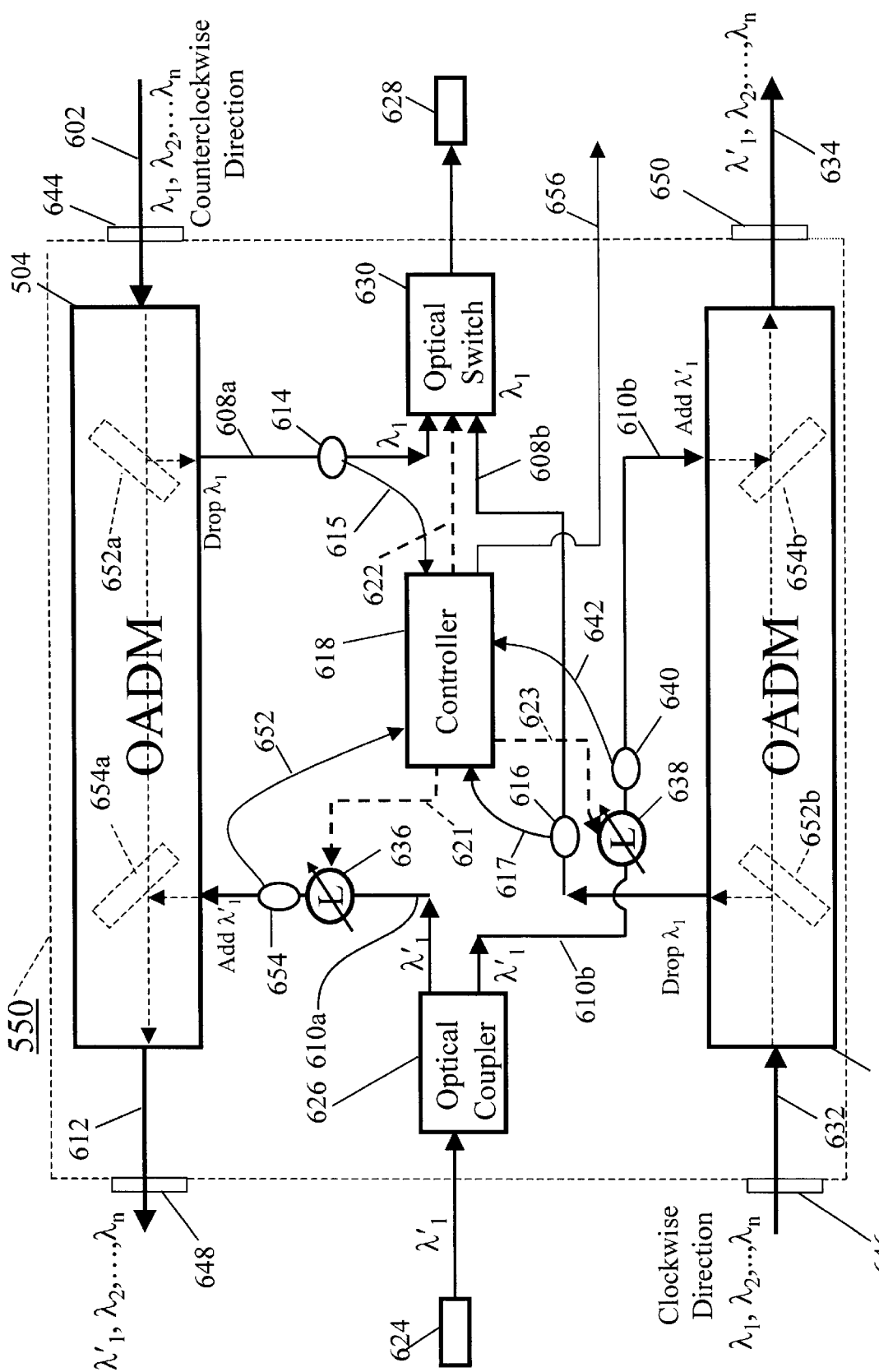
FIG. 6 illustrates a node comprising a switching assembly as utilized within an optical network system in accordance with the present invention.

FIG. 6 is an illustration of a switching assembly 550 in accordance with the present invention. Switching assembly can be used in conjunction with the two-fiber ring network of FIG. 5, and is representative the switching assemblies 550.1–550.(2n–2) included in each of the nodes 503.1–503.(2n–2) of FIG. 5. As described in more detail below, switching assembly 550 serves the multiple functions of adding or dropping channels from the two counter-propagating rings of a ring network, matching the powers of the added channels to those of the channels in the rings of the network, and switching higher quality traffic from either one of the two counter-propagating rings to a receiver of subscriber, in a process referred to as "ring selection intelligence." The function of maximum power and minimum power intelligence, detailed below, can also be performed by switching assembly 550.

Switching assembly 550 is provided with optical add-drop multiplexers (OADMs) 504 and 508 having respective input ports 644 and 646 for receiving input signals along lines 602 and 632, respectively, from associated counter-propagating rings of a two-fiber ring network. The OADMs 504 and 508 each comprises at least one beam separator, which can be an optical filter such as filters 652a, 652b, disposed in the optical path of the incoming wavelength division multiplexed (WDM) signals and operating to selectively extract one or more signals representing one or more optical channels, therefrom. A dropped signal is represented in the drawing figure by the symbol $\lambda_1$ OADMs 504 and 508 also comprise at least beam combiners 654a, 654b, operating to add one or more add signals representing one or more add channels to the WDM signals of the associated rings. An added signal is represented in the drawing figure by the symbol $\lambda_1'$. OADMs 504 and 508 are also provided with network output ports 648 and 650 for outputting output signals, as modified by the signal adding and/or dropping described above, from OADMs 504 and 508, along lines 612 and 634, respectively, onto the associated counter-propagating rings of the two-fiber ring network.

To enable ring selection intelligence, switching assembly 550 is further provided with an optical switch 630, which operates in one of two states depending on a control signal from a controller 618. In a first state, switch 630 directs a drop signal from the counterclockwise ring network to receiver 628 of a particular network subscriber by way of filter 652a and drop line 608a. In a second state, switch 630 directs a drop signal from the clockwise ring network to receiver 628 by way of filter 652b and drop line 608b.

Controller 618 receives known portions of the power of the drop signals in lines 608a and 608b through optical taps 614 and 616 and monitoring lines 615 and 617. The power in these two monitoring signals is monitored in order to determine from which of the two counter-propagating rings the drop signal with the higher optical power is being received. When it is determined that the drop signal on line 608a has a higher optical power than the drop signal on line 608b, then the switch 630 switched such that the drop signal on line 608a is propagated to receiver 628. When, on the other hand, the optical power of the drop signal on line 608b exceeds that on line 608a, then the drop signal on line 608b is propagated to receiver 628. Detection of a sudden burst of power on a particular ring, or an abrupt loss of power on a ring, can be used to indicate the relative operational states of the rings. In the event of failure of one of the rings, the state of switch 630 is then controlled accordingly by the control signal from controller 618 in order to direct drop signals from the operational ring to the receiver 628. The control signal from controller 618 is conveyed to optical switch 630 via electronic control line 622. Controller 618 can be a suitable processing device programmed to perform the described functions using algorithms suitably tailored to the particular switching assembly characteristics and to the environment in which the switching assembly 550 is employed. Alternatively, controller 618 can comprise electronic circuits and "hardware" suitably configured to provide the same functions.

Controller 618 also performs the functions of minimum power and maximum power intelligence, wherein it issues an alarm signal, which is conveyed to the network operator (not shown), for example via signaling line 656, when it determines that the powers from both rings are below receiver sensitivity or are too high and exceed the saturation power of receiver 628, which is the maximum power threshold for the receiver to work normally. The maximum threshold rule also applies to the ring selection intelligence, wherein traffic is chosen with the higher power, but which is below the maximum threshold.

Power matching is also performed by controller 618. A optical taps 640 and 654 tap known portions of the signal power from transmitter 624 and provide these portions as inputs to controller 618 via line 642 and 652, respectively. Based on these inputs, and on the inputs representing portions of the optical power in drop lines 608*a* and 608*b* delivered via taps 614 and 616 and lines 615 and 617, respectively, the controller issues control signals on lines 621 and 623. These control signals control the level of attenuation effected by variable optical attenuators 636 and 638 to thereby match the power of the add signal being added to the ring networks via lines 610*a* and 610*b* with the power of the drop signal from the ring networks in a manner similar to that described above with respect to the self-adjusting OADM of FIG. 4.

What is claimed is:

1. A self-adjusting OADM (optical add-drop multiplexer) comprising:
   at least one beam separator;
   at least one beam combiner;
   a controller having first and second optical inputs and a control output, the first optical input being in optical communication with the beam separator, the controller being adapted to generate a control signal at the control output in accordance with the relative power of first and second monitoring signals at the first and second optical inputs, the first and second monitoring signals representing predetermined portions of first and second optical signals; and
   a variable optical attenuator in optical communication with the beam combiner and having a control input connected to the control output of the controller, the second optical signal passing through the variable optical attenuator for attenuation by the variable optical attenuator in accordance with the control signal.

2. The self-adjusting OADM of claim 1, wherein the first signal comprises a channel of a wavelength division multiplexed (WDM) signal which is optically selected by the beam separator.

3. The self-adjusting OADM of claim 2, further comprising an optical tap disposed between the beam separator and the controller, the optical tap directing a predetermined portion of the first optical signal to the first optical input of the controller.

4. The self-adjusting OADM of claim 1, further comprising an optical tap disposed between the variable optical attenuator and the beam combiner, the optical tap directing a predetermined portion of the second optical signal to the second optical input of the controller.

* * * * *